(No Model.) 2 Sheets—Sheet 2.
A. R. CORSON.
SPEED REGULATOR.
No. 314,228. Patented Mar. 24, 1885.
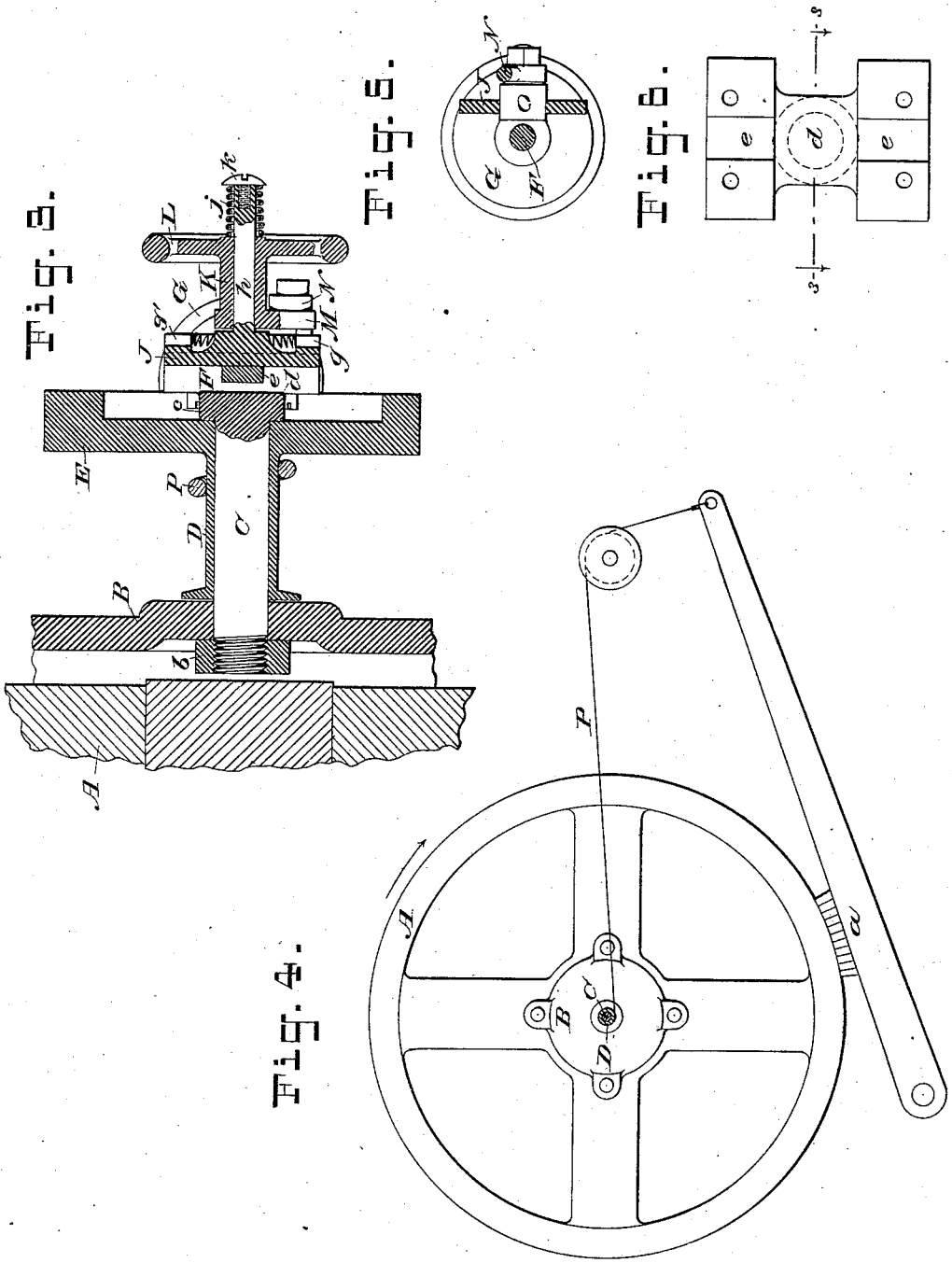
WITNESSES:
Geo. H. Fraser.
C. K. Fraser.
INVENTOR:
Aaron R. Corson
By his Attorneys,
Burke Fraser Bennett

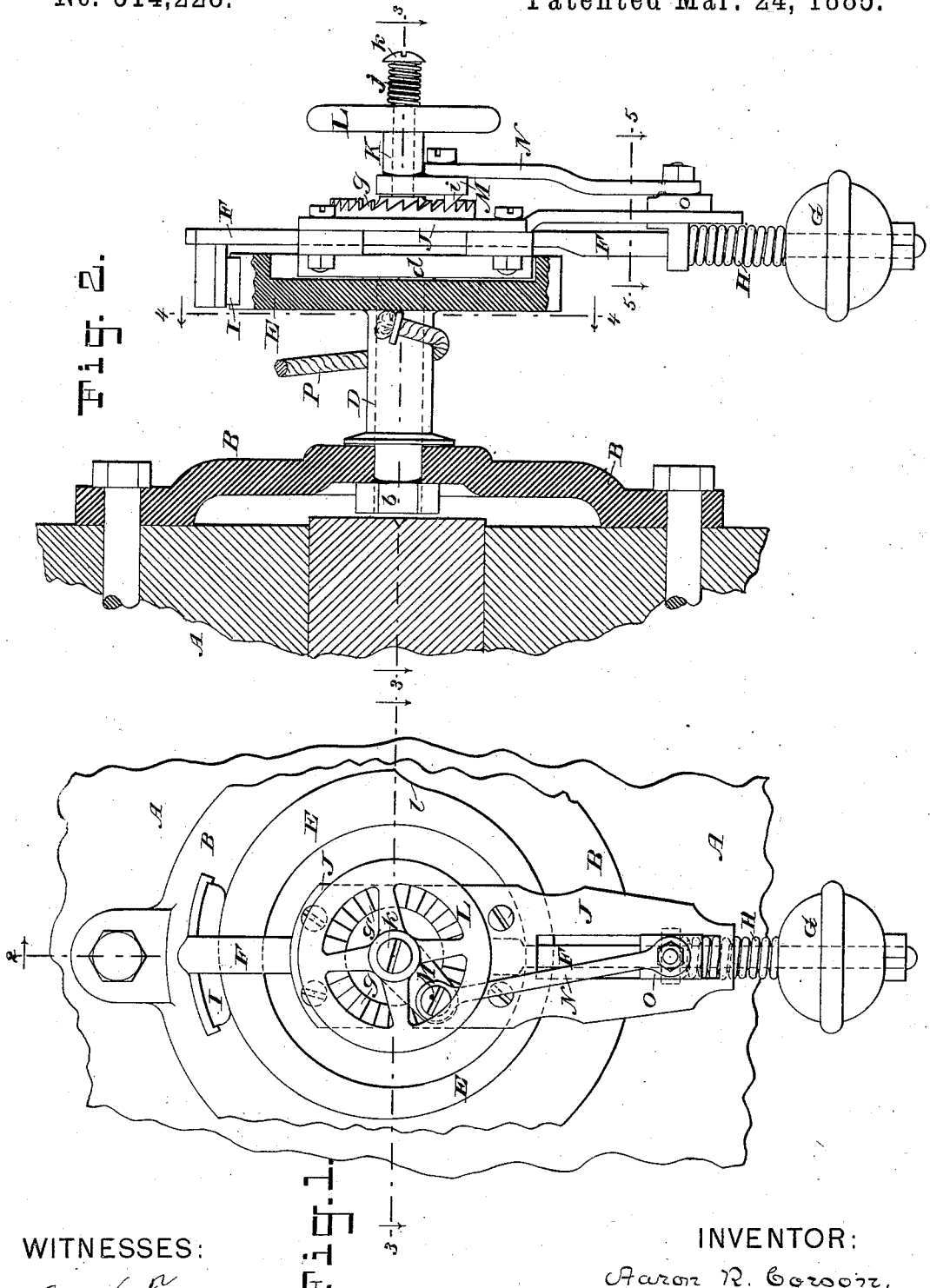

UNITED STATES PATENT OFFICE.

AARON R. CORSON, OF HIGH BRIDGE, NEW JERSEY, ASSIGNOR OF ONE-HALF TO WM. H. CORSON, OF SAME PLACE.

SPEED-REGULATOR.

SPECIFICATION forming part of Letters Patent No. 314,228, dated March 24, 1885.

Application filed August 29, 1884. (No model.)

*To all whom it may concern:*

Be it known that I, AARON R. CORSON, a citizen of the United States, and a resident of High Bridge, Hunterdon county, New Jersey, have invented certain Improvements in Speed-Regulators, of which the following is a specification.

My invention relates to that class of speed-regulators wherein an increase of speed acts by centrifugal force applied through a ball or weight to apply a rotating brake to a windlass-barrel, whereby friction is exerted on said barrel which tends to wind a rope or chain thereon, and thus set the main brake on the main driving or fly wheel. My improvements in this class of speed-regulators will be fully set forth hereinafter, and defined in the claims.

Although I have employed my speed-regulators to horse-powers where the horse applies the power by treading an endless apron, and although it is particularly well adapted to these powers, yet it may be employed with excellent results to regulate the speed of any rotary machine of a similar character, as a water-wheel, for example.

In the drawings, which serve to illustrate my invention, Figure 1 is a front elevation of my improved speed-regulator. Fig. 2 is a side elevation of the same, wherein the main or fly wheel is in section and a part of the rim of the brake wheel or drum is broken away. Fig. 3 is a horizontal section on line 3 3 in Fig. 2. Fig. 4 is a view on a small scale, showing the manner of connecting the regulator to the main brake so as to operate the latter and control the movement of the fly-wheel. This view may be considered as a section on line 4 4 in Fig. 2, but on a smaller scale. Fig. 5 shows the cross-head in plan, the view being substantially a section on line 5 5 in Fig. 2. Fig. 6 is a detached detail view that will be explained hereinafter.

A represents the main or fly wheel of the machine, the speed of which is to be controlled by means of the main brake $a$. (Shown only in Fig. 4.) The purpose of the regulator is to so apply this brake as to keep the speed of the wheel A uniform and prevent it from acquiring undue velocity when the load is thrown off.

Referring now to the first three figures, B is a base piece or bracket rigidly secured to the wheel A, and C, Fig. 3, is an axis or spindle for the windlass-barrel, secured in the bracket B by a nut, $b$. On the axis C is rotatively mounted the barrel D, to which is attached the friction drum or wheel E. The drum E and barrel D constitute in reality one part, the former supplying the brake-surface and the latter the surface on which the brake-rope is wound.

On the axis C is a shoulder, $c$, which serves to keep the barrel D and drum E in place, and a T-head, $d$, and on this T-head are provisions in which are formed grooves $e$, in which plays a rod or stem, F, bearing on one end a weight or ball, G, and spring H, and on the other a brake-shoe, I, which presses on the periphery of the drum E, as seen in Fig. 1. The detached view, Fig. 6, shows the T-head $d$ in front elevation.

J is a plate secured to the T-head $d$ over the face of the stem F, whereby the latter is inclosed in its sliding bearings $e$. On the face of plate J are two semicircular ratchets, $g$ and $g'$, and from the said plate J projects a stem or spindle, $h$, Fig. 3, on which is rotatively mounted a sleeve, K, bearing a hand-wheel, L, and an arm or crank, M. The arm M bears a tooth, I, which engages either one of the racks $g$ or $g'$, and is held in engagement therewith by a spring, $j$, which abuts against the head of a screw, $k$, in the end of stem $h$.

The arm M is coupled by a rod, N, to a cross-head, O, which bears on spring H and slides in a guide-slot in plate J. The stem F passes through this cross-head, as shown in Fig. 5.

P, in Figs. 2, 3, and 4, is the brake rope or chain which connects the barrel D with the lever of the brake $a$.

The axes of stem $h$ and spindle C should coincide, and they should also coincide with the axis of the wheel A.

Having thus described the construction of my improved regulator so far, I will now describe its operation.

When the velocity of the wheel A exceeds the predetermined limit, the centrifugal force, acting to throw the ball G outward radially, draws the brake-shoe I up forcibly against the periphery of drum E, whereby the tendency of the latter to rotate is increased. This tends to wind rope P on the barrel D, and the strain thus brought upon the rope is transferred through its lever to brake $a$, which is thus caused to press on the periphery of the wheel A and reduce its rotary velocity. When the speed slackens, the action of the centrifugal force on the ball is correspondingly reduced and the rope is again slackened.

The normal pressure of the brake-shoe I on drum E may be increased at will while the machine is in motion by turning the hand-wheel L to the left, which acts through the crank M, rod N, and cross-head O to compress spring H. To reduce the normal pressure, the wheel L is drawn back (by compression of spring $j$) until tooth $i$ is free from ratchet $g$, when the wheel is turned to the right and tooth $i$ allowed to engage the ratchet at another point. This reduces the tension of spring H.

In order to apply the brake $a$ to the wheel A with a varying or intermittent pressure, I make the drum E of a scroll-like form, instead of circular. This forms an offset or shoulder at $l$ in Fig. 1, off which the brake-shoe I slips at each revolution. Thus as the said shoe is carried around drum E in the direction of the arrow in Fig. 1 the pressure is gradually increased by the compression of spring H between the weight G and cross-head O. Thus the brake on the wheel A is allowed to drop back and release wheel A at each revolution, and the said wheel is permitted to gather momentum for an instant. I find this method of applying the brake to produce more satisfactory results than when the brake acts continuously on the wheel.

My object in employing two ratchets, $g$ and $g'$, is this: When the wheel A rotates in the direction indicated by the arrow, and the tension of spring $h$ is to be increased while the machine is in motion, it is only necessary to arrest the motion of hand-wheel L for an instant in order to make tooth $i$ engage the teeth of the ratchet $g$ farther ahead, and thus compress spring H; but in some machines the wheel A revolves in the other direction. Therefore, in applying my regulator to these I swing the arm or crank M over to the other side and permit tooth $i$ to engage ratchet $g'$. The tooth in this case is turned around and set to properly face the teeth of the ratchet. This construction of the double ratchet is simply to better adapt my regulator to different machines, and is not essential to its proper working.

The ratchets are concentric to stem $h$, and may be formed on or attached to plate J.

The sleeve K being merely a connection between wheel L and arm M it may be omitted and the said arm and wheel be connected together. I employ it merely to give room for the hand to grasp the wheel.

The plate J and T-head $d$ might be in one piece; but I find it convenient to construct them as shown; or the spindle C might be formed in one with the bracket B, and the T-head $d$ of the said spindle be made removable, so as to enable the barrel D and drum E to be slipped on. These variations in the construction, and others of a similar nature, may be made without departing materially from my invention.

Having thus described my invention, I claim—

1. A speed-regulator of substantially the construction shown, provided with a drum, E, having a scroll-like form, substantially as shown, and for the purposes set forth.

2. The combination, with a wheel, A, and its brake $a$, of the spindle C, mounted on said wheel, the barrel D, and brake-rope P, the scroll-like drum E, fixed to the barrel, the stem F, mounted in sliding bearings, substantially as shown, and provided with a weight, G, and brake-shoe I, arranged to press on the drum E, and the means, substantially as described, for varying the normal pressure of the brake-shoe on the drum while the machine is in motion, substantially as set forth.

3. The combination, with the barrel, the drum, their spindle, the sliding rod, its brake-shoe, and weight, of the plate J, stem $h$, sleeve K, hand-wheel L, arm M, provided with tooth $i$, ratchet $g$ on plate J, rod N, cross-head O, the spring H, and the spring $j$, arranged to keep the tooth $i$ in engagement with the ratchet, all constructed and arranged to operate substantially as set forth.

In witness whereof I have hereunto signed my name in the presence of two subscribing witnesses.

AARON R. CORSON.

Witnesses:
 DAVID L. EVERETT,
 ISAAC P. BAILEY.